United States Patent [19]

Radtke et al.

[11] Patent Number: 4,807,523

[45] Date of Patent: Feb. 28, 1989

[54] VENTILATING SYSTEM FOR AUTOMOTIVE VEHICLE

[75] Inventors: Wolfgang Radtke, Steinenbrück; Freddie Soethout, Cologne, both of Fed. Rep. of Germany

[73] Assignee: Siemens Aktiengesellschaft, Berlin and Munich, Fed. Rep. of Germany

[21] Appl. No.: 78,858

[22] Filed: Jul. 28, 1987

[30] Foreign Application Priority Data

Jul. 30, 1986 [DE] Fed. Rep. of Germany ....... 3625681

[51] Int. Cl.⁴ .................................................. B60H 1/26
[52] U.S. Cl. ........................................ 98/2.15; 98/2.04
[58] Field of Search ................. 98/2.09, 2.04, 2.15, 98/40.01, 5, 10, 14

[56] References Cited

U.S. PATENT DOCUMENTS

| | | | |
|---|---|---|---|
| 2,720,149 | 10/1955 | Groene | 98/2.15 |
| 2,987,980 | 6/1961 | Winn | 98/2.15 |
| 3,366,026 | 1/1968 | Herr et al. | 98/2.15 |
| 3,913,468 | 10/1975 | Krämer et al. | 98/2.15 |
| 4,252,053 | 2/1981 | Muto et al. | 98/2.15 |

FOREIGN PATENT DOCUMENTS

| | | | |
|---|---|---|---|
| 950110 | 10/1956 | Fed. Rep. of Germany | |
| 2126667 | 12/1972 | Fed. Rep. of Germany | 98/2.15 |
| 1152813 | 4/1985 | U.S.S.R. | 98/2.04 |

*Primary Examiner*—Harold Joyce
*Attorney, Agent, or Firm*—Kenyon & Kenyon

[57] ABSTRACT

A system for ventilating the passenger compartment of an automotive vehicle comprises an air discharge nozzle located at approximately the center of the vehicle's dashboard along a lower edge of the windshield. The nozzle ejects a broad air stream upwardly along an inner surface of the windshield. The air stream is received by a funnel located along the upper edge of the windshield between the windshield and the rearview mirror. The interior of the funnel communicates with an interspace defined by the vehicle roof and a roof lining. The interspace is closed along the rear window and is provided with air deflection elements for steering a portion of the inflowing air stream laterally towards the sides of the vehicle. The roof lining is provided above the passenger seats with a multiplicity of openings having adjustable cross-sectional areas for varying the amount of air entering the passenger compartment through the openings. Directional louvers or grids are also provided for varying the direction of air flow through the roof lining openings into the passenger compartment. The roof interspace decreases in width towards the rear end of the vehicle, while lateral slots are formed in the roof lining along the side windows of the vehicle.

15 Claims, 4 Drawing Sheets

VENTILATING SYSTEM FOR AUTOMOTIVE VEHICLE

BACKGROUND OF THE INVENTION

This invention relates to a ventilating system for the passenger compartment of an automotive vehicle. More particularly, this invention relates to such a ventilating system in which air is channeled to the vehicle's passenger compartment via an interspace between the vehicle roof and a roof lining.

The passenger compartment of an automobile generally has a size of 2 to 3 m³. In order to cool the passenger compartment in warm weather, 300 to 700 m³/h of ambient air or air cooled by an air conditioning system are guided through the compartment. Such a high rate of air flow results in many air changes with heavy drafts on the passengers. Opening the side windows of an automobile or sliding roofs likewise leads to large changes in the air in the passenger compartment and at high speeds can result in harmfully high air velocities and noises in the passenger compartment. Because of the annoyance of drafts and of the fear of catching cold, sensitive people frequently dispense with an effective cooling of the passenger compartment.

If, in overheated vehicles, individual passengers direct air discharge nozzles in the dashboard at themselves, the outflowing air can fall on perspiring passengers and lead to rheumatic complaints or to colds.

In order to improve air distribution, cooled air can be conducted through the space between the vehicle roof and the roof lining and let out above the driver. This solution to the ventilating problem, as set forth in U.S. Pat. No. 2,720,149, has required a double-walled rear window which is disadvantageous in passenger vehicles because of the added weight. In addition, only a small improvement of air flow is obtained.

As described in German Patent No. 950 110, the forward roof struts can be used for conducting air from a heat exchanger into an interspace between the roof and a roof lining, the air flowing from the interspace laterally towards the side windows and back towards the rear window of the automobile. While air distribution is improved by such an arrangement, the relatively narrow flow channels are exposed to the sun and cause the air to be heated before it enters the roof space.

A ventilating system is known in which air flows between the roof of a vehicle and a continuous roof lining from the front towards the rear of the vehicle. The roof lining is spaced a predetermined constant distance from the vehicle roof and is provided with outlet openings. The space between the vehicle roof and the roof lining serves to conduct the air. The purpose of this known system is to maintain the window panes of the vehicle free of condensation and frost especially at the beginning of a journey and to ensure a clear view through the windshield and the rear window. Accordingly, air is conducted from the front of the vehicle to the rear without drafts to ensure rapid defrosting. Heated air is blown out of several slots extending parallel to the windshield, is conducted parallel to the windshield and is subsequently guided into the roof space by means of sun visors which must be disposed in predetermined positions for this purpose. From the roof space, the air is conducted essentially along the roof to the rear window. A disadvantage of this arrangement is that the air stream flowing along the windshield can be deflected if the sun visors are not properly positioned.

The air can in some instances be deflected upon passengers sitting nearby. The guiding of the air therefore depends on the positioning of the sun visors and is not effective in the sun visors are moved to the side. Moreover, because of the multiplicity of slots parallel to the windshield and because of their small cross-sectional areas and correspondingly large jet surfaces, a large portion of the kinetic energy of the air stream is converted by injection before it reaches the upper edge of the windshield. The high pressure required in the region of the upper edge of the windshield necessitates a high exit velocity with a concomitantly high level of noise. In addition, the flow from the rood lining is non-uniform and practically no outflow occurs in the forward range with the high air velocities. Finally, the outflow is towards the rear end of the vehicle rather than perpendicularly into the passenger compartment.

In this known ventilating system, the lower part of the roof lining consists of the same material as the upper part and is provided along its entire extent with relatively small air exit openings. For maintaining a uniform distance between the upper part of the roof and the lower part thereof, a thin support wall having an accordion profile is provided, the support wall being drawn in between the mutually facing flat sides of the upper and lower parts of the roof lining. In that manner, an interspace is created which has an approximately uniform cross-section over its length and which is open towards the rear window of the vehicle. That arrangement, however, is unsuitable for distributing cooled air, for example, from an air conditioner to the passenger compartment free of drafts. The arrangement is further dependent on incident solar radiation inasmuch as the positioning of the sun visors may disturb or destroy their functioning as air guide elements.

An object of the present invention is to provide an improved ventilating system of the above-mentioned type.

Another object of the present invention is to provide such a ventilating system in which a substantially uniform low-velocity air flow is achieved.

Yet another object of the present invention is to provide such a ventilating system which has reduced noise.

Another, more particular, object of the present invention is to provide such a ventilating system which is independent of the positioning of the sun visors.

Yet another particular object of the present invention is to provide such a ventilating system in which air flow to individual passenger seats can be essentially independent of air flow towards other seats.

SUMMARY OF THE INVENTION

The instant invention is directed to a ventilation system for a motor vehicle having a roof, a windshield and a rear window together partially defining a passenger compartment. Pursuant to the invention, the ventilation system comprises an air discharge nozzle disposed at a lower end of the windshield in the passenger compartment for discharging a compact, focused, low-turbulence stream of air along an upward path at least approximately parallel to the windshield. Preferably, the air discharge nozzle is formed independently of any heating elements at the windshield of the vehicle. A funnel is disposed at an upper end of the windshield for receiving the stream of air, the funnel having an inlet opening approximately a cross-section of the stream of air at the upper end of the windshield. A lining is spaced from the roof in the passenger compartment to form an interspace along an upper side of the passenger compartment, the interspace communicating with the funnel for receiving the stream of air therefrom. The interspace is closed at a rear end, i.e., in a region about the rear window of the automobile, whereby a pressure head having substantially uniform air pressure is produced througout the interspace. A plurality of outlet apertures are provided in the roof lining for directing air from the interspace into the passenger compartment. Preferably, at least some of the outlet apertures are located above each passenger seat.

Pursuant to further features of the present invention, the nozzle has a discharge opening with a width to depth ratio less than approximately five and a laminar choke is disposed upstream from the nozzle.

In accordance with several particular features of the present invention, deflection elements are disposed between the roof and the lining in the interspace for laterally deflecting air flow, while means are provided for adjusting magnitude and/or direction of air flow through the apertures above predetermined portions of the passenger compartment such as the passenger seats. The magnitude of air flow can be adjusted in a well known manner by changing the cross-sectional areas of the outlet apertures. Similarly, the directions of air flow can be modified exemplarily by means of louvers or rotatable directional nozzles. Ideally, the magnitudes and/or directions of air flow are adjustable from each passenger seat individually.

Advantageously, the interspace is subdivided into a plurality of subspaces each communicating with the funnel, valve members being provided for regulating air flow into each of the subspaces individually. The subspaces may correspond, for example, to respective passenger seats. In addition, the interspace preferably has a height which decreases in a direction from the funnel towards the rear window and the roof lining is provided along opposing edges with air exit slots juxtaposed to side windows of the vehicle. The laterally disposed air exit slots result in stabilization of the air jet and in a shielding of the vehicle wall surface.

In accordance with further particular features of the present invention, the funnel has a cross-sectional area decreasing from the inlet opening towards the interspace and the funnel is provided on a downstream side with a constricted portion in turn provided with at least one air slot in the manner of a Venturi tube. The air slot draws in, in the manner of an injector, air from the passenger space which had not yet been picked up by the opening funnel.

DETAILED DESCRIPTION

Figure 1:
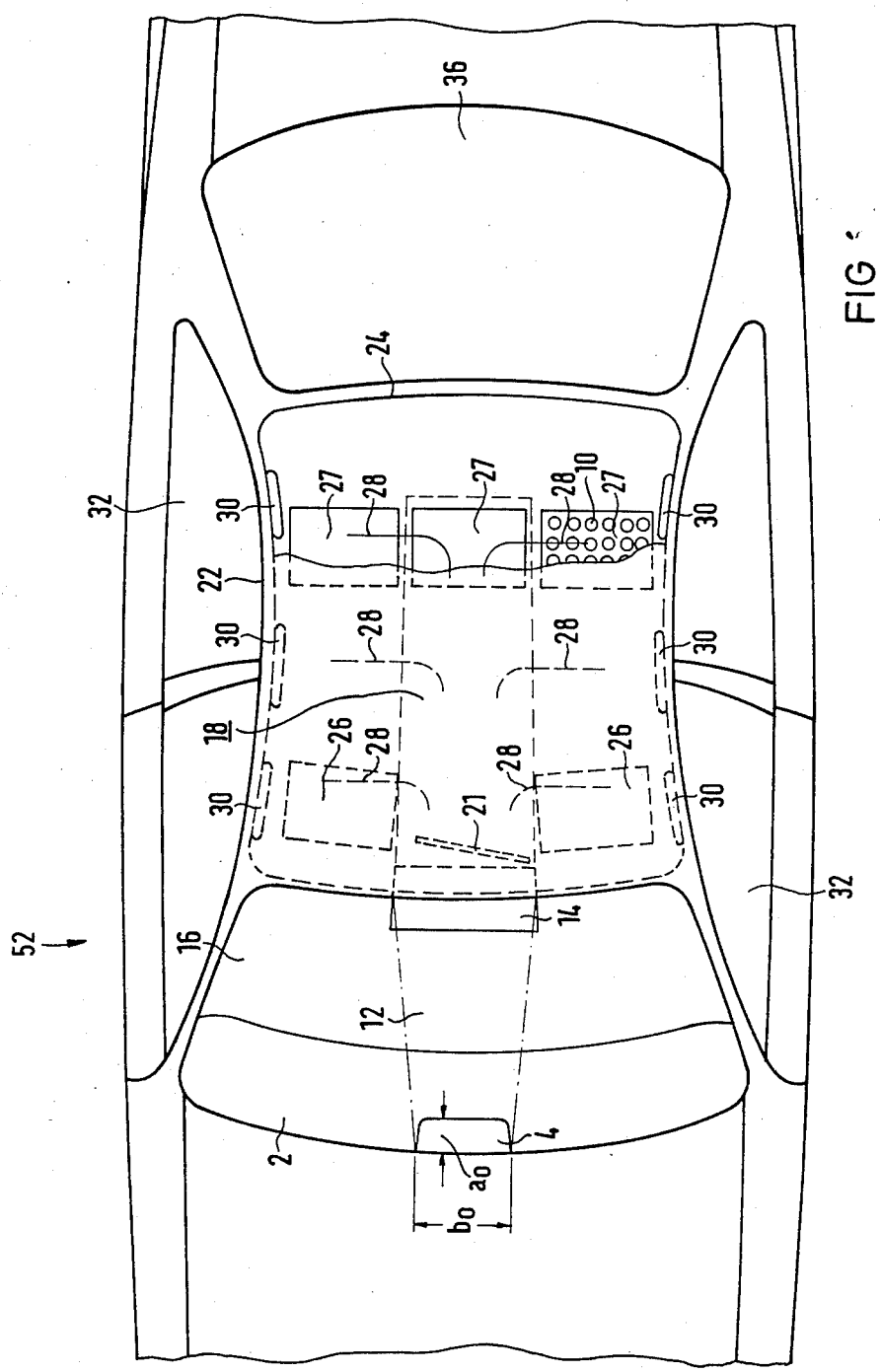
FIG. 1 is a partial schematic top view of an automotive passenger vehicle provided with a ventilation system in accordance with the present invention.
Figure 2:
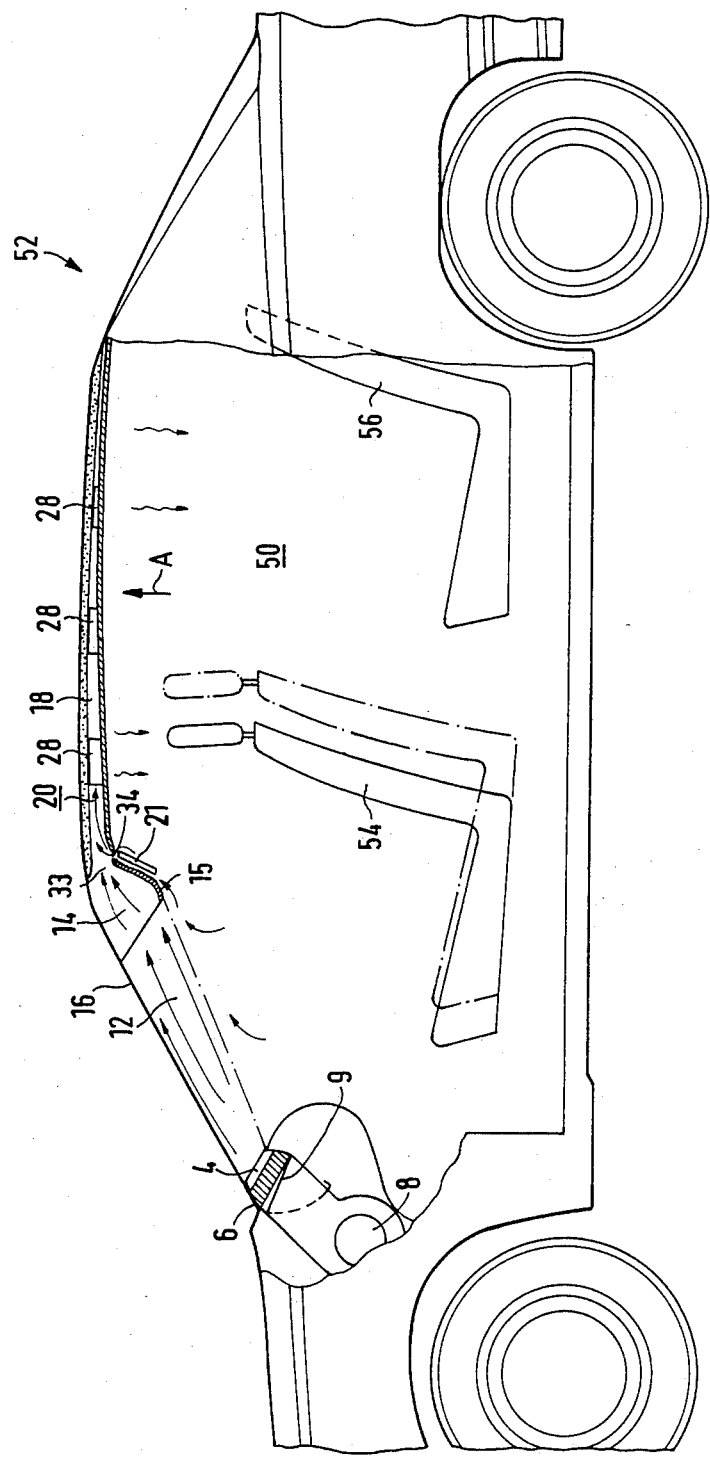
FIG. 2 is a partial schematic side elevational view, partially in cross section, of the vehicle of FIG. 1.

As illustrated in FIGS. 1 and 2, a system for ventilating the passenger compartment 50 of an automotive vehicle 52 and particularly for supplying air conditioned air to the passenger compartment comprises an air discharge nozzle 4 disposed approximately at the center of a dashboard 2 and at a lower end of a windshield 16 in passenger compartment 50 for discharging a compact, focused, low-turbulence stream of air along an upward path or channel 12 at least approximately parallel to the windshield. The nozzle is preferably separate from any window heater provided along dashboard 2. Air discharge nozzle 4 has a width $b_o$ and a depth $a_o$ with a width-to-depth ratio not substantially in excess of 5:1 and preferably approximately 3:1.

The air stream discharged by nozzle 4 is received by a funnel 14 having an inlet opening which approximates the cross-section of the air stream in a region about the upper edge of windshield 16. The interior of the funnel communicates with an interspace 20 defined on an upper side by a roof 22 of vehicle 52 and on a lower side by a roof lining 24. Interspace 20 is closed at a rear end, i.e., in a region along an upper edge of a rear window 26, which enables the build up in interspace 20 of a pressure head having substantially uniform air pressure.

Figure 5:
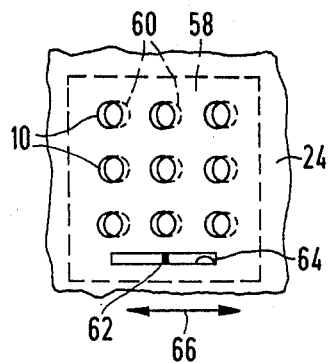
FIG. 5 is a partial bottom view of a roof lining, taken in the direction of an arrow A in FIG. 2.

Roof lining 24 is provided in predetermined regions above seats 54 and 56 in passenger compartment 50 with air exit or discharge apertures 10 only a few of which are shown in the drawing. Apertures 10 are preferably designed with an air passage cross-sectional area of variable size so that the air flow through apertures 10 into passenger compartment 50 can be adjusted from the individual passenger seats 54 and 56. As depicted in FIG. 5, slide members 58 may be provided in regions 26 and 27 for varying the cross-sectional areas of the associated air exit apertures 10. Each slide member 58 takes the form of a plate provided withan array of circular holes 60 having essentially the same sizes and distribution as apertures 10 in the respective region 26 or 27. Each slide member is further provided with a finger grip 62 traversing a slot 64 in roof lining 24 for enabling the manual sliding of the slide member alternately in opposite directions, as indicated by an arrow 66.

Figure 6:
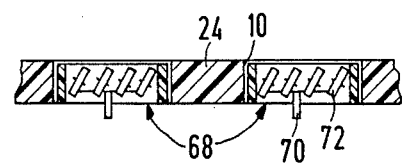
FIG. 6 is a partial cross-sectional view, taken perpendicularly to the roof and a roof lining of an automotive vehicle having a ventilation system in accordance with a particular embodiment of the present invention.

In addition, or alternatively, manually adjustable directional louvers or air discharge grilles 68 (FIG. 6) may be provided in regions 26 and 27 for selectively varying the direction that air is discharged into passenger compartment 50 through apertures 10. As depicted in FIG. 6, louvers or grilles 68 may each have a cylindrical form and be rotatably mounted in a respective aperture 10 in roof lining 24. Each individual grill 68 may be provided with a lever 70 for changing the angle of inclination of deflector elements 72. Alternatively, a single louver or grill component (not shown) may be disposed in juxtaposition to a plurality of apertures 10.

In a central region 18 of interspace 20, air flows substantially from the front end of the automobile towards the rear end thereof. By providing air deflector or steering elements 28 between roof 20 and roof lining 24 in interspace 20, part of the air flow is directed laterally from the central region 18 towards the sides of the automobile. In this manner, a substantially uniform pressurization of interspace 20 and a concomitantly uniform flow of air into passenger compartment 50 is achieved. It is to be noted that the air flow downward into the passenger compartment is at least approximately perpendicular to roof lining 24. Because of this nearly perpendicular air flow, practically no air is directed towards any particular seat if the apertures 10 above the seat are closed. If, on the contrary, the apertures 10 above a selected seat 54 or 56 are wide open, a large air stream is directed towards that seat without significantly affecting passengers in other seats of the vehicle.

Roof lining 24 is advantageously provided with air discharge slots 30 juxtaposed to and above side windows 32 of passenger vehicle 52, as shown in FIG. 1. By conducting air in this manner, a stabilization of the air jet and a shielding of the wall surfaces of the vehicle are attained. In addition, the passage of air through slots 30 serves to heat side windows 32 during the winter and cool the side windows during the summer.

As depicted in FIG. 2, a ventilation system pursuant to the present invention may include a laminar choke 6 disposed upstream of air discharge nozzle 4 and downstream of a blower 8 and a damper 9. Choke 6 acts to straighten out the air flow leaving nozzle 4. With a flow straightener in the form of a laminar choke, flow noise within air discharge nozzle 4 is considerably reduced, whereby a very compact arrangement of the air feed assembly immediately downstream of blower 8 is possible.

Air discharged through nozzle 4 flows along wall-less path or channel 12 towards funnel 14 which is disposed between windshield 16 on a forward side and a wall 15 on a rearward side. Rear wall 15 is positioned in the vicinity of a rearview mirror 21. Funnel 14 is further defined by side walls 74 (FIG. 1). Rear wall 15 of funnel 14 preferably converges towards windshield 16 so that funnel 14 has a cross-sectional area which decreases from the inlet opening of the funnel towards interspace 20. The reduction in cross-sectional area results in an approximately linear or steady flow constriction in turn giving rise to a steady flow acceleration along the length of the funnel.

At a constriction portion 33, funnel 14 is provided with at least one air slot 34 which functions in the manner of an injector or Venturi tube to draw into the flow in the funnel air which is not captured by the inlet opening of funnel 14. Funnel 14 is disposed under an upper portion of windshield 16 and utilizes a space between the windshield and rearview mirror 21. Independently of air flow path or channel 12 and funnel 14, sun visors (not illustrated) may be provided on both sides of funnel 14, possibly in the area of the inlet opening of the funnel.

Deflector elements 28 can also be designed as insulators for limiting heat transfer between roof 22 and the stream of air flowing through interspace 20.

Figure 3:
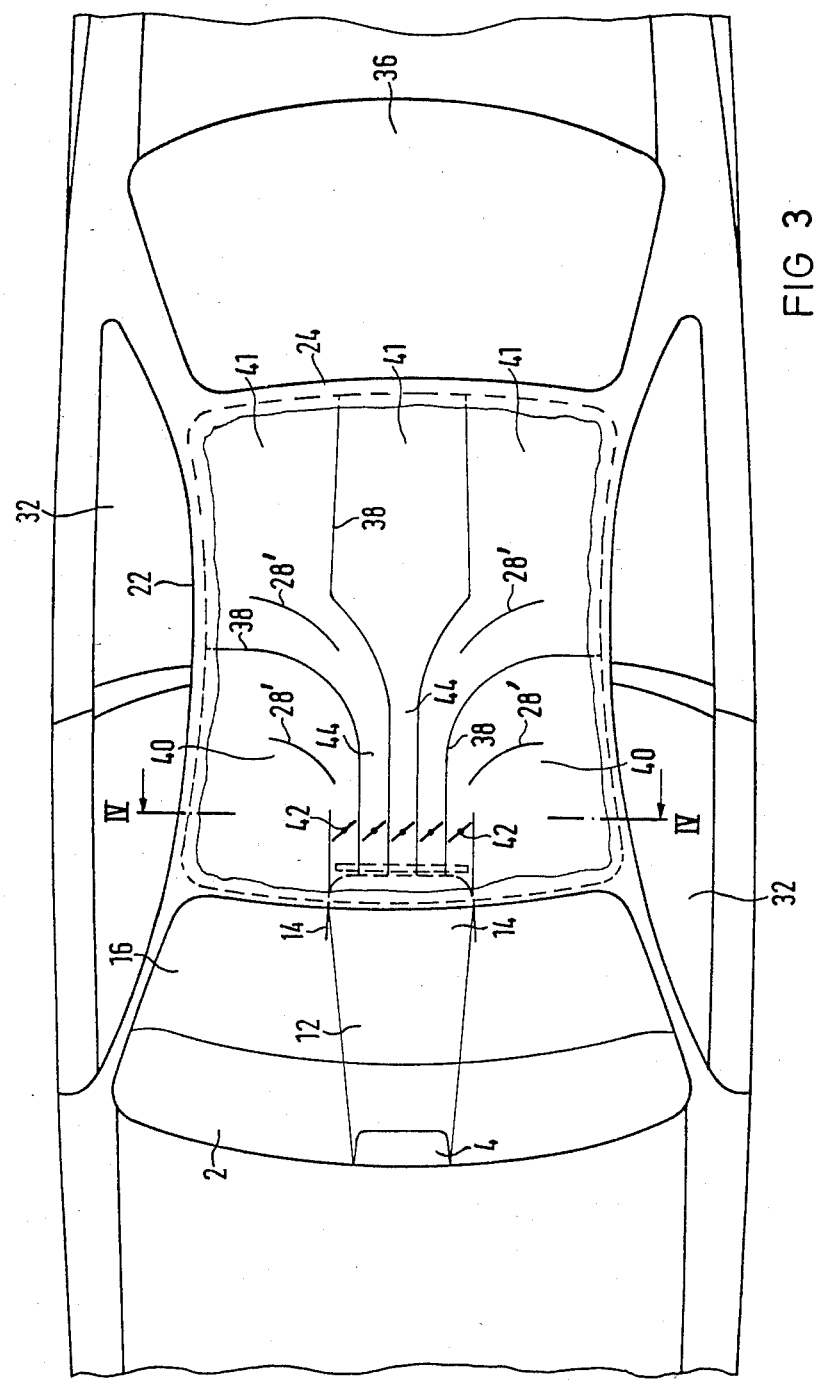
FIG. 3 is a partial schematic top view of an automotive passenger vehicle provided with another embodiment of a ventilation system in accordance with the present invention.

As shown in FIG. 3, an interspace between a vehicle roof and a roof lining may be subdivided by partitions 38 into a plurality of subspaces 40 and 41 generally corresponding to the seats in the passenger compartment. With each subspace or panel 40 and 41 is associated a respective damper or valve member 42 each disposed in a respective flow channel 44 leading to the associated subspace 40 or 41. Flow channels 44 are formed by the same separating partitions or ribs 38 as define subspaces 40 and 41. In some applications, additional deflection elements 28' may be positioned between partitions 38 for facilitating lateral distribution of the inflowing air.

Figure 4:
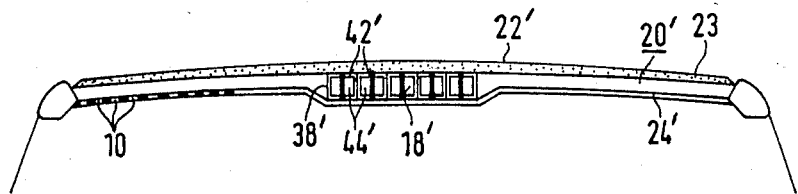
FIG. 4 is a transverse cross-sectional view taken along line IV—IV in FIG. 3.

FIG. 4 shows another advantageous embodiment of a ventilation system in accordance with the present invention wherein an interspace 20' between a vehicle roof 22' and a roof lining 24' is provided in a central region 18' with an increased height to form a main flow canal for air entering the interspace from the funnel 14 (FIG. 1). Below insulation 23 of the vehicle roof 22', partitions 38' are provided for conducting air and dampers 42' are provided for controlling air distribution in flow canals 44.

In some cases, it may be advantageous to narrow the main flow canal 18 from the front end thereof (at funnel 14) to the rear end of the vehicle. Preferably, the flow canal 18 takes a wedge-shaped form and has a height which gradually decreases from the front toward the rear of the vehicle, as shown in FIG. 2. The decrease in height of canal 18 or of the entire interspace 20 or 20' serves to provide a uniform lateral air flow to subspaces 40 and 41 (FIG. 3).

In some circumstances, a filter can be provided for the removal of dust and/or noxious fumes from the fresh air. Such a filter can be disposed in interspace 20 or 20', in roof lining 24 or 24' or in the vicinity of blower 8 upstream of air discharge nozzle 4.

What is claimed is:

1. A ventilation system for a motor vehicle having a roof, a windshield and a rear window together partially defining a passenger compartment, said ventilation system comprising in combination:
   air discharge means including a nozzle disposed at a lower end of said windshield in said passenger compartment for discharging a compact, focused, low-turbulence stream of air along an upward path at least approximately parallel to said windshield;
   receiving means including a funnel disposed at an upper end of said windshield for receiving said stream of air, said funnel having an inlet opening approximating a cross-section of said stream of air at said upper end of said windshield;
   a lining spaced from said roof in said passenger compartment to form an interspace along an upper side of said passenger compartment, said interspace communicating with said funnel for receiving said stream of air therefrom;
   pressurization means for generating a substantially uniform air pressure throughout said interspace, said pressurization means including closure of said interspace essentially entirely along a rear end thereof;
   outlet means including a plurality of apertures in said lining for directing air from said interspace into said passenger compartment;
   said nozzle including a discharge opening with a width to depth ratio of less than approximately five;
   said air discharge means further including a laminar choke disposed upstream from said nozzle;
   said air discharge means being independent of a heater mounted at the lower end of said windshield; and
   said apertures being arranged directly above seats mounted in said passenger compartment.

2. The ventilation system defined in claim 1 wherein said outlet means includes means for adjusting magnitude of air flow through said apertures above predetermined portions of said passenger compartment.

3. The ventilation system defined in claim 1 wherein said outlet means includes means for adjusting direction of air flow through said apertures above predetermined portions of said passenger compartment.

4. The ventilation system defined in claim 1, further comprising means for subdividing said interspace into a plurality of subspaces each communicating with said funnel, further comprising means for regulating air flow to each of said subspaces individually.

5. The ventilation system defined in claim 1 wherein said funnel has a cross-sectional area decreasing from said inlet opening towards said interspace.

6. A ventilation system for a motor vehicle having a roof, a windshield and a rear window together partially defining a passenger compartment, said ventilation system comprising in combination:
- air discharge means including a nozzle disposed at a lower end of said windshield in said passenger compartment for discharging a compact, focused, low-turbulence stream of air along an upward path at least approximately parallel to said windshield;
- receiving means including a funnel disposed at an upper end of said windshield for receiving said stream of air, said funnel having an inlet opening approximating a cross-section of said stream of air at said upper end of said windshield;
- a lining spaced from said roof in said passenger compartment to form an interspace along an upper side of said passenger compartment, said interspace communicating with said funnel for receiving said stream of air therefrom;
- pressurization means for generating a substantially uniform air pressure throughout said interspace, said pressurization means including closure of said interspace essentially entirely along a rear end thereof;
- outlet means including a plurality of apertures in said lining for directing air from said interspace into said passenger compartment; and
- said pressurization means including deflection elements disposed between said roof and said lining in said interspace for laterally deflecting air flow.

7. A ventilation system for a motor vehicle having a roof, a windshield and a rear window together partially defining a passenger compartment, said ventilation system comprising in combination:
- air discharge means including a nozzle disposed at a lower end of said windshield in said passenger compartment for discharging a compact, focused, low-turbulence stream of air along an upward path at least approximately parallel to said windshield;
- receiving means including a funnel disposed at an upper end of said windshield for receiving said stream of air, said funnel having an inlet opening approximating a cross-section of said stream of air at said upper end of said windshield;
- a lining spaced from said roof in said passenger compartment to form an interspace along an upper side of said passenger compartment, said interspace communicating with said funnel for receiving said stream of air therefrom;
- pressurization means for generating a substantially uniform air pressure throughout said interspace, said pressurization means including closure of said interspace essentially entirely along a rear end thereof;
- outlet means including a plurality of apertures in said lining for directing air from said interspace into said passenger compartment; and
- said interspace having a height which decreases in a direction from said funnel towards said rear window.

8. A ventilation system for a motor vehicle having a roof, a windshield and a rear window together partially defining a passenger compartment, said ventilation system comprising in combination:
- air discharge means including a nozzle disposed at a lower end of said windshield in said passenger compartment for discharging a compact, focused, low-turbulence stream of air along an upward path at least approximately parallel to said windshield;
- receiving means including a funnel disposed at an upper end of said windshield for receiving said stream of air, said funnel having an inlet opening approximating a cross-section of said stream of air at said upper end of said windshield;
- a lining spaced from said roof in said passenger compartment to form an interspace along an upper side of said passenger compartment, said interspace communicating with said funnel for receiving said stream of air therefrom;
- pressurization means for generating a substantially uniform air pressure throughout said interspace, said pressurization means including closure of said interspace essentially entirely along a rear end thereof;
- outlet means including a plurality of apertures in said lining for directing air from said interspace into said passenger compartment; and
- said funnel being provided on a downstream side thereof with a constricted portion in turn provided with at least one air slot in the manner of a Venturi tube.

9. A ventilation system for a motor vehicle having a roof, a windshield and a rear window together partially defining a passenger compartment, said ventilation system comprising in combination:
- air discharge means including a nozzle disposed at a lower end of said windshield in said passenger compartment for discharging a compact, focused, low-turbulence stream of air along an upward path at least approximately parallel to said windshield;
- receiving means including a funnel disposed at an upper end of said windshield for receiving said stream of air, said funnel having an inlet opening approximating a cross-section of said stream of air at said upper end of said windshield;
- a lining spaced from said roof in said passenger compartment to form an interspace along an upper side of said passenger compartment, said interspace communicating with said funnel for receiving said stream of air therefrom;
- pressurization means for generating a substantially uniform air pressure throughout said interspace, said pressurization means including closure of said interspace essentially entirely along a rear end thereof;
- outlet means including a plurality of apertures in said lining for directing air from said interspace into said passenger compartment; and
- said pressurization means including deflection elements disposed between said roof and said lining in said interspace for laterally deflecting air flow, said outlet means including means for adjusting magnitude of air flow through said apertures above predetermined portions of said passenger compartment.

10. The ventilation system defined in claim 9 wherein said outlet means includes means for adjusting direction of air flow through said apertures above predetermined portions of said passenger compartment.

11. The ventilation system defined in claim 10, further comprising means for subdividing said interspace into a plurality of subspaces each communicating with said funnel, further comprising means for regulating air flow into each of said subspaces individually.

12. The ventilation system defined in claim 11 wherein said interspace has a height which decreases in a direction from said funnel towards said rear window.

13. The ventilation system defined in claim 12 wherein said lining is provided along opposing edges with air exit slots juxtaposed to side windows of said vehicle.

14. The ventilation system defined in claim 13 wherein said funnel has a cross-sectional area decreasing from said inlet opening towards said interspace.

15. The ventilation system defined in claim 14 wherein said funnel is provided on a downstream side with a constricted portion in turn provided with at least one air slot in the manner of a Venturi tube.

* * * * *